Figure 1:
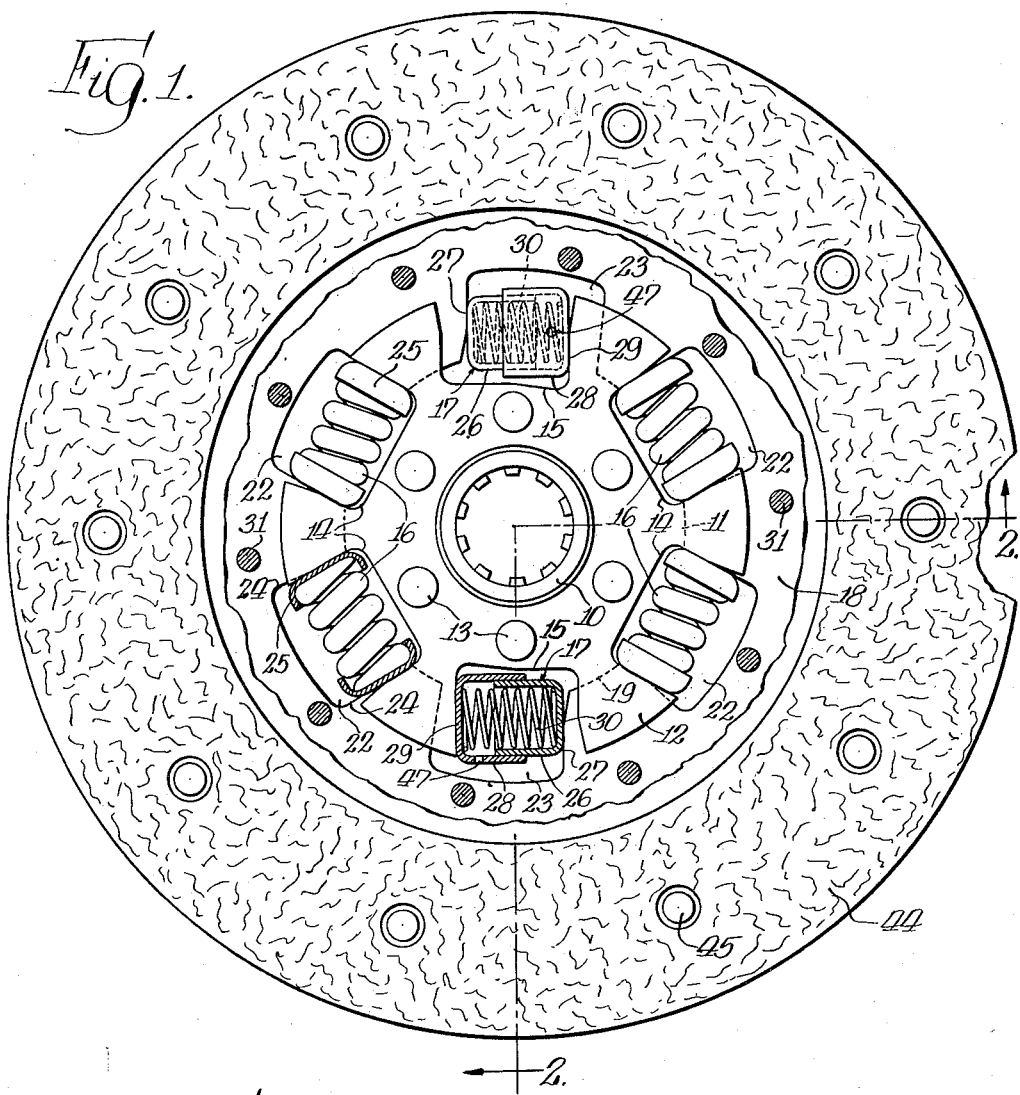

July 4, 1950 W. V. THELANDER 2,513,379
FRICTION CLUTCH PLATE
Filed Sept. 28, 1944

Inventor:-
W. Vincent Thelander
Andrew F. Wintercorn
Atty.

Patented July 4, 1950

2,513,379

UNITED STATES PATENT OFFICE 2,513,379

FRICTION CLUTCH PLATE

W. Vincent Thelander, Auburn, Ind., assignor to Dana Corporation, Toledo, Ohio, a corporation of Virginia Application September 28, 1944, Serial No. 556,199

18 Claims. (Cl. 192—68)

This invention relates to motion transmitting elements, and is more particularly concerned with improvements in automotive type friction clutch plates.

In my earlier Patent 2,316,820, I disclosed a clutch plate having spring means between the relatively oscillatory inner and outer elements and incorporating fluid damping means in the hub to deaden the sound otherwise emanating from the springs and other portions of the hub structure in operation, and I disclosed shock absorbing pistons and cylinders in conjunction with the coiled compression springs forming the spring cushioning means, each piston and cooperating cylinder serving not only to form a fluid pumping device using the fluid damping medium as its working fluid to give increased cushioning action in one direction, but also to check the recoil of the springs to smoothen the drive, in addition to serving as a spring retainer to prevent rubbing contact between the associated spring and adjacent parts of the plate. However, in that patent and others along similar lines, the pistons were arranged to expel the fluid simultaneously with the compression of the springs, and, therefore, the only reaction after a torque impulse was the resistance to the return movement of the pistons imposed by the restricted intake of fluid into the cylinder. Depending upon the viscosity or fluidity of the fluid, there was apt to be suction created in the cylinders and under such conditions the recoil checking action obtained was not satisfactory, atmospheric pressure placing a definite limit upon the rate of intake of the fluid. It is, therefore, the principal object of my present invention to provide a motion transmitting element such as a clutch plate of the character described in which there is provided in combination with the coiled compression springs forming the spring cushioning means, pistons and cylinders for the shock absorbing means in which the pistons are arranged to move on the intake stroke in the compression of the springs and on the exhaust stroke in the expansion of said springs, whereby the working fluid is discharged in the proper relationship to the expansion of the springs to give the desired recoil checking action, and atmospheric pressure no longer imposes a limitation upon the recoil checking action obtainable, and the desired action may be definitely obtained by the proper variation in the size of the exhaust ports used.

The shock absorbing pistons and cylinders, in accordance with this invention, are designed so as to enclose compression springs arranged to expand as the coiled compression springs forming the spring cushioning means are compressed, and vice versa. These springs in the shock absorbing means, therefore, also exert a predetermined recoil checking effect in and of themselves tending to further smoothen the drive.

The invention is illustrated in the accompanying drawing, in which—

Figure 2:
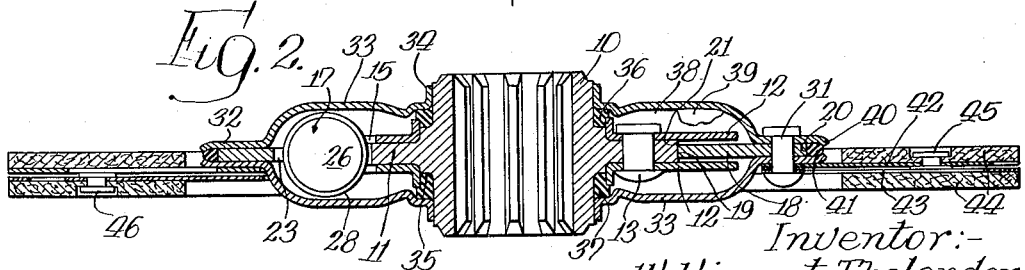

Fig. 1 is a face view of a clutch plate made in accordance with my invention, showing one of the hub housing plates broken away to better illustrate the hub construction, some portions of which are also shown in section for better illustration, and Fig. 2 is a section taken on the broken line 2—2 of Fig. 1.

The same reference numerals are applied to corresponding parts in these two views.

Referring to the drawing, the clutch plate shown comprises relative rotatable inner and outer portions, the inner portion being formed by a center hub 10 splined for driving connection with the driving shaft of an automotive transmission and provided with an annular flange 11 onto opposite sides of which two circular sheet metal plates 12 are riveted, as indicated at 13. These plates have a plurality of circumferentially spaced openings or notches 14 and 15 provided therein, there being four openings 14 for the cushioning springs 16 and two openings 15 for the shock absorber assemblies 17. The shock absorber assemblies are in diametrically opposed relation and the cushioning springs 16 are in diametrically opposed pairs between the shock absorber assemblies, spaced approximately 60° apart, as shown. While I have shown four cushioning springs 16, I may, of course, provide only two in diametrically opposed relation midway between the shock absorbers. A ring 18, the inner and outer peripheries 19 and 20 of which are in concentric relation to the periphery 21 of the flange 11, has notches 22 cut therein in register with the notches 14 and other notches 23 in register more or less with the notches 15 and is disposed between the plates 12, as clearly appears in Fig. 2, for engagement of the ends 24 of the notches 22 with the spring cushioning means 16, the drive being taken at one end of the notched portions 22 and by the respectively opposite ends of the notches 14 in the plates 12 in a manner well understood in this art. The springs 16 have their ends seated in stamped sheet metal cups 25 which provide smooth flat circular surfaces for abutment with the ends of the notches 14 and 22. The notches 23 are normally displaced angularly with respect to the notches 15 to the extent shown in Fig. 1 so that the pistons 26 of the shock absorber means 17 engage only the one end 27 of the notches 23 and the pistons 28 of said shock absorber means engage only the respectively opposite end 29 of the notches 15. In other words, the springs 30 housed inside these piston and cylinder assemblies are normally compressed in relation to the springs 16 so that when the springs 16 are compressed upon relative rotary movement between the inner and outer portions of the clutch plate, the springs 30 expand, and when the springs 16, after a torque impulse, expand, the springs 30 are compressed.

The ring 18 is riveted at circumferentially spaced points, as indicated at 31, between the peripheral flanges 32 of two sheet metal housing plates 33. The latter have central circular openings defined by circular flanges 34 which have close fitting bearing engagement on opposite ends of the hub 10 in spaced relation to the annular shoulders 35. The circular plates 12 riveted onto the opposite sides of the flange 11 have circular central openings defined by outwardly bent flanges 36 fitting over the peripheries of the shoulders 35 and projecting toward the plates 33 so as to retain compressible resilient gaskets 37 between these parts. These gaskets serve to seal the annular oil or grease chamber 38 in the hub housing against leakage of the heavy lubricating oil or grease with which the chamber 38 is filled, a portion of the fill being indicated at 39 in Fig. 2. The flanges 32 project radially beyond the outer periphery 29 of the ring 18 and have inwardly bent peripheral edge portions 40 between which another gasket 41 of compressible resilient material is retained in compressed condition so as to seal the outer periphery of the chamber 38 against leakage of the oil or grease 39. These gaskets 37 and 41 are preferably of an oil resistant rubber such as neoprene. The rivets 31 also serve to fasten two sets of sheet metal stampings 42 and 43 to the rings 18 with the housing plates 33, and these stampings carry the annular facing rings or pads 44, rivets 45 serving to fasten the one pad to the stampings 42, and rivets 46 serving to fasten the cushion pad to the stampings 43.

In operation, when relative movement occurs between the inner and outer portions of the clutch plate, the springs 16 are compressed to cushion the drive. At the same time, heavy oil or grease 39, with which the chamber 38 is filled, is drawn into the shock absorbers 17 through the small ports 47 provided in the cylinders 28, the pistons 26 being moved outwardly in relation to the cylinders under the expansion of the springs 30 in the relative movement mentioned, due to the fact that the notches 15 and 23 are brought into more or less complete register in this relative movement. There is, in other words, a pumping action in the shock absorbers 17 taking in working fluid, coincident with the compression of the springs 16. This pumping action adds materially to the cushioning effect and the springs 16 are accordingly relieved of some of the cushioning load. The heavy oil or grease 39 used for the working fluid is indicated only to the extent shown in Fig. 2 to avoid confusion, but it will, of course, be understood that the chamber 38 is actually filled with it. The recoil action of the springs 16 is checked by the shock absorbers 17, because their return to the normal contracted condition shown in Fig. 1 is retarded as a result of the restriction of the ports 47 through which the heavy oil or grease 39 must flow. The manufacturer of these clutch plates can, of course, vary the size of the ports 47 to suit the requirements of the particular engine in connection with which the clutch plate is to be used and thus obtain the exact reaction desired. The springs 30, furthermore, are subjected to compression in the recoil action of the springs 16 and accordingly check that action to an appreciable extent. The springs 30, as clearly appears in Fig. 1, are relatively light in relation to the heavier cushioning springs 16 for obvious reasons. Whereas friction breaking means used heretofore to resist the return of the parts of a spring cushioned plate to normal position after compression of the springs were unsatisfactory because of the fact that the friction surfaces relied upon were subject to wear and there was usually no satisfactory way of compensating for it, the heavy oil or grease 39 used with the present construction affords the desired checking or shock absorbing action without perceptible wear on the relative movable parts 26 and 28, inasmuch as the oil or grease serves to lubricate these parts. Another very important function of the oil or grease 39 is its dampening or sound deadening action; it serves to absorb the primary vibrations substantially entirely, and, working with the piston and cylinder assemblies 17, serves to substantially completely dampen secondary vibrations. In other constructions where many precautions are taken to obtain quiet operation, including the use of non-metallic members to avoid metal-to-metal contact, the springs used for cushioning were frequently a source of noise due to vibration, but with the present construction even that objection is avoided, because the springs 16 and 30 are immersed in the heavy oil or grease 39, and, of course, it goes without saying that this heavy oil or grease has the same sound deadening effect upon all of the other parts with which it is in contact and as a result the present clutch plate operates much more quietly than others.

While I have disclosed only ports 47 in the cylinders 28 for intake and discharge of the working fluid, it should be understood that I do not limit my invention to that specific construction. I may, for example, provide either in combination with said ports 47, or in addition thereto, check valves or the like arranged to open easily when a reduction in pressure is created inside the cylinders 28 and to remain closed otherwise, preferably under spring pressure, whereby to insure prompt filling of the cylinders should there be any tendency toward the creation of suction in the cylinders. In that way, the recoil action of the springs 16 can be definitely and accurately controlled by merely providing the proper sized ports 47, their size being determined mainly from the standpoint of the resistance to discharge of working fluid therethrough and more or less independently of the matter of the intake of fluid into the cylinders 28.

It is believed the foregoing description conveys a good understanding of all of the objects and advantages of my invention. The appended claims have been drawn to cover all legitimate modifications and adaptations.

I claim:

1. A motion transmitting element, comprising relatively oscillatable inner and outer members, a first and relatively heavy coiled compression spring for resisting relative rotary movement between the inner and outer members by compression of said spring, a second and relatively lighter coiled compression spring normally held in a predetermined compressed condition between the inner and outer members, and arranged to expand during the compression of the first spring upon relative rotary movement between the inner and outer members and be compressed in the return of said inner and outer members to normal relationship, whereby said second spring resists recoil of the first spring, and an inter-fitting piston and cylinder associated with said second spring and normally held in extended relation to one another by said spring, said piston and cylinder exerting further resistance to relative rotary movement between the inner and outer members by the pumping action thereof.

2. A motion transmitting element, comprising relatively oscillatable inner and outer members, a first and relatively heavy coiled compression spring for resisting relative rotary movement between the inner and outer members by compression of said spring, a second and relatively lighter coiled compression spring normally held in a predetermined compressed condition between the inner and outer members, and arranged to expand during the compression of the first spring upon relative rotary movement between the inner and outer members and be compressed in the return of said inner and outer members to normal relationship, whereby said second spring resists recoil of the first spring, an inter-fitting piston and cylinder associated with said second spring and normally held in extended relation to one another by said spring, said piston and cylinder exerting further resistance to relative rotary movement between the inner and outer members by the pumping action thereof, and a housing enclosing said springs and inter-fitting piston and cylinder and containing a liquid damping medium cooperating with said inter-fitting piston and cylinder as the working fluid therefor in the resistance to relative rotary movement between the inner and outer members by the intake and discharge of said liquid into and out of said cylinder.

3. A motion transmitting element, comprising relatively oscillatable inner and outer members, a first coil compression spring for resisting relative rotary movement between the inner and outer members by compression of said spring, the compression and expansion of said first spring being inherently unobstructed, a second coiled compression spring normally held in a predetermined compressed condition between the inner and outer members, and arranged to expand during the compression of the first spring upon relative rotary movement between the inner and outer members and be compressed during the return of said inner and outer members to normal relationship, whereby said second spring resists recoil of the first spring, and an inter-fitting piston and cylinder associated only with said second spring and normally held in extended relation to one another by said spring, said piston and cylinder exerting further resistance to relative rotary movement between the inner and outer members by the pumping action thereof.

4. A motion transmitting element, comprising relatively oscillatable inner and outer members, a first coiled compression spring for resisting relative rotary movement between the inner and outer members by compression of said spring, the compression and expansion of said first spring being inherently unobstructed, a second coiled compression spring normally held in a predetermined compressed condition between the inner and outer members, and arranged to expand during the compression of the first spring upon relative rotary movement between the inner and outer members and be compressed during the return of said inner and outer members to normal relationship, whereby said second spring resists recoil of the first spring, an inter-fitting piston and cylinder associated only with said second spring and normally held in extended relation to one another by said spring, said piston and cylinder exerting further resistance to relative rotary movement between the inner and outer members by the pumping action thereof, and a housing enclosing said springs and inter-fitting piston and cylinder and containing a liquid damping medium cooperating with said inter-fitting piston and cylinder as the working fluid therefor in the resistance to relative rotary movement between the inner and outer members by the intake and discharge of said liquid into and out of said cylinder.

5. In a clutch plate, comprising relatively oscillatable inner and outer members, the inner member comprising a center hub, the outer member comprising a housing surrounding said hub, and an outer plate portion rigid with the housing and adapted to have limited rotary movement therewith relative to the hub, said outer plate portion carrying friction facing material for friction drive of the plate, the combination of spring means acting between the hub and housing to resist by its deflection the relative rotary movement therebetween, another spring means arranged to unload during the deflection of the first spring means and acting between the hub and housing to resist the return movement, whereby to check the recoil action of the first spring means, and an inter-fittting relatively reciprocable piston and cylinder constituting a fluid checking means cooperating with the second spring means to exert principal resistance to relative movement in the return direction.

6. In a clutch plate, comprising relatively oscillatable inner and outer members, the inner member comprising a center hub, the outer member comprising a housing surrounding said hub, and an outer plate portion rigid with the housing and adapted to have limited rotary movement therewith relative to the hub, said outer plate portion carrying friction facing material for friction drive of the plate, the combination of spring means acting between the hub and housing to resist by its deflection the relative rotary movement therebetween, and other spring means arranged to unload during the deflection of the first spring means and acting between the hub and housing to resist return movement, whereby to check the recoil action of the first spring means, a liquid damping medium with which said housing is substantially filled surrounding the spring means to absorb the sound incident to vibration thereof, and an inter-fitting relatively reciprocable piston and cylinder arranged to be given relative reciprocatory movement with the movement of the second spring means and constituting a fluid checking means utilizing the liquid damping medium as its working fluid and arranged to take in said liquid in the relative rotary movement between said housing and hub and to discharge said liquid in the return movement, whereby to resist the recoil action of said spring means.

7. In a clutch plate, comprising relatively oscillatable inner and outer members, the inner member comprising a center hub, the outer member comprising a housing surrounding said hub, and an outer plate portion rigid with the housing and adapted to have limited rotary movement therewith relative to the hub, said outer plate portion carrying friction facing material for friction drive of the plate, the combination of spring means acting between the hub and housing to resist by its deflection the relative rotary movement therebetween, another spring means arranged to unload during the deflection of the first spring means and acting between the hub and housing to resist return movement, whereby to check the recoil action of the first spring means, a liquid damping medium with which said housing is substantially filled surrounding the two spring means to absorb the sound incident to vibration thereof, and an inter-fitting relative reciprocable piston and cylinder enclosing the second spring means and utilizing the liquid damping medium as its working fluid and arranged to take in said liquid in the relative rotary movement between said hub and housing and to discharge said liquid in the return movement.

8. A motion transmitting element, comprising relatively oscillatable inner and outer members, a plurality of coiled compression springs for resisting relative rotary movement between the inner and outer members, a plurality of coiled compression springs for resisting return movement of said inner and outer members, and an inter-fitting piston and cylinder associated only with each of the second named springs and normally urged to extended relation to one another by said spring but normally held with said spring in relatively compressed preloaded condition, said piston and cylinder being movable relative to one another toward extended relationship in the relative rotary movement between the inner and outer members in one direction, said piston and cylinder being constructed to have restricted discharge of fluid therefrom in the return movement of said inner and outer members so as to retard the recoil action of the first mentioned springs.

9. A motion transmitting element as set forth in claim 8, wherein the outer member comprises a housing surrounding a portion of the inner member along with said springs and associated pistons and cylinders, the motion transmitting element including a liquid damping medium substantially completely filling the housing and constituting the working fluid for said pistons and cylinders.

10. A motion transmitting element, comprising relatively oscillatable inner and outer members having a plurality of openings normally arranged in register and a plurality of other openings normally arranged partially in register, coiled compression springs disposed in the first mentioned openings to resist by compression thereof relative rotary movement between the inner and outer members in one direction, and coiled compression springs normally compressed in the other openings and arranged to expand upon said relative rotary movement between said members, in which said openings are brought into closer register, and to be compressed in the return movement whereby to check the recoil action of the first mentioned springs.

11. A motion transmitting element, comprising relatively oscillatable inner and outer members having a plurality of openings normally arranged in register and a plurality of other openings normally arranged partially in register, coiled compression springs disposed in the first mentioned openings to resist by compression thereof relative rotary movement between the inner and outer members in one direction, and coiled compression springs normally compressed in the other openings and arranged to expand upon said relative rotary movement between said members, in which said openings are brought into closer register, to be compressed in the return movement whereby to check the recoil action of the first mentioned springs, and an interfitting piston and cylinder associated with each of the second named springs and normally urged toward extended relation thereby, but normally held in contracted relationship in the second named openings prior to relative rotary movement between said members, said inter-fitting piston and cylinder serving by the dashpot action thereof to retard relative rotary movement between said members and the return movement.

12. A motion transmitting element as set forth in claim 11, wherein the outer member comprises a housing surrounding a portion of the inner member along with said springs and associated pistons and cylinders, said motion transmitting element including a liquid damping medium substantially completely filling the housing and constituting the working fluid for said pistons and cylinders.

13. In a clutch plate, comprising relatively oscillatable inner and outer members, the inner member comprising a center hub, the outer member comprising a housing surrounding the hub and an outer plate portion rigid with the housing and adapted to have limited rotary movement therewith relative to the hub, said outer plate portion carrying friction facing material for friction drive of the plate, the combination of a plurality of coiled compression springs in circumferentially spaced relation relative to said members acting between the hub and housing to resist by their compression relative rotary movement therebetween, two other coiled compression springs in diametrically opposed relation relative to said members arranged to expand during the compression of the first mentioned springs and acting between the hub and housing to resist return movement therebetween, and shock absorber means individual to each of the last named springs to resist compression thereof and thereby help to check the recoil action of the first mentioned springs.

14. A clutch plate as set forth in claim 13, including a liquid damping medium substantially completely filling the housing and constituting the working fluid for said shock absorber means.

15. A motion transmitting element comprising relatively oscillatable inner and outer members, a coiled compression spring disposed so as to resist relative rotary movement between said inner and outer members, another, but lighter, coiled compression spring which is preloaded and disposed so as to expand in the last named movement and be compressed in the return movement so as to resist the latter, and an interfitting piston and cylinder associated with one of said springs and normally urged to extended relation to one another by said spring, said piston and cylinder being constructed to permit only a restricted flow of fluid so as to retard the recoil action of the first named spring.

16. A motion transmitting element comprising relatively oscillatable inner and outer members having a pair of openings normally arranged in register, a coiled compression spring disposed in said openings to resist by compression thereof relative rotary movement between said members in one direction, said members having another pair of openings normally arranged only partially in register, and a second but lighter coiled compression spring normally compressed in the latter openings and arranged to expand upon said relative rotary movement between said members as the latter openings are brought into closer register and to be compressed in the return movement of said members whereby to check the recoil action of the first mentioned spring.

17. A motion transmitting element comprising relatively oscillatable inner and outer members having a pair of openings normally arranged in register, a coiled compression spring disposed in said openings to resist by compression thereof relative rotary movement between said members in one direction, said members having another pair of openings normally arranged only partially in register, a second but lighter coiled compression spring normally compressed in the latter openings and arranged to expand upon said relative rotary movement between said members as the latter openings are brought into closer register and to be compressed in the return movement of said members whereby to check the recoil action of the first mentioned spring, and an interfitting piston and cylinder associated with one of said springs and normally urged toward extended relation thereby and serving by the dashpot action thereof to retard relative rotary movement between said members and check the recoil action of the first mentioned spring.

18. A motion transmitting element as set forth in claim 17, wherein the outer member comprises a housing surrounding a portion of the inner member along with said springs and associated piston and cylinder, said motion transmitting element including a liquid damping medium substantially completely filling the housing and constituting the working fluid for said piston and cylinder.

W. VINCENT THELANDER.

REFERENCES CITED

The following references are of record in the file of this patent:

UNITED STATES PATENTS

| Number | Name | Date |
|---|---|---|
| 1,865,482 | Riedel | July 5, 1932 |
| 1,977,368 | Wood | Oct. 16, 1934 |
| 2,115,819 | Lewis | May 3, 1938 |
| 2,221,800 | Johnson | Nov. 19, 1940 |

Certificate of Correction

Patent No. 2,513,379 July 4, 1950

W. VINCENT THELANDER

It is hereby certified that error appears in the printed specification of the above numbered patent requiring correction as follows:

Column 5, lines 7 and 28, respectively, for the word "in" read *during*; column 6, line 57, for "and other" read *another*;

and that the said Letters Patent should be read as corrected above, so that the same may conform to the record of the case in the Patent Office.

Signed and sealed this 28th day of November, A. D. 1950.

[SEAL]

THOMAS F. MURPHY,
*Assistant Commissioner of Patents.*